United States Patent
Sasso et al.

[11] Patent Number: 6,124,687
[45] Date of Patent: Sep. 26, 2000

[54] APPARATUS FOR SOLVING BEARING LIFE AND TORQUE COMPENSATION PROBLEMS IN SYSTEMS WITH OSCILLATING COMPONENTS

[75] Inventors: Felix T. Sasso, Los Angeles; John G. Blanche, IV, Fullerton, both of Calif.

[73] Assignee: Raytheon Company, Lexington, Mass.

[21] Appl. No.: 09/304,148

[22] Filed: May 3, 1999

[51] Int. Cl.[7] .................................................. H02K 7/00
[52] U.S. Cl. ......................... 318/128; 318/119; 318/127; 310/90
[58] Field of Search .................................. 310/36, 37, 38, 310/90; 318/126, 127, 128, 119

[56] References Cited

U.S. PATENT DOCUMENTS

| | | | |
|---|---|---|---|
| 5,208,497 | 5/1993 | Ishii et al. | 310/12 |
| 5,675,201 | 10/1997 | Komura et al. | 310/90.5 |
| 5,739,607 | 4/1998 | Wood, III | 310/90.5 |

*Primary Examiner*—Nick Ponomarenko
*Assistant Examiner*—Judson H. Jones
*Attorney, Agent, or Firm*—Colin M. Raufer; Leonard A. Alkov; Glenn H. Lenzen, Jr.

[57] ABSTRACT

A system that extends the life of bearings that support a primary payload and operate in oscillatory mode. The system integrates the primary payload, a reaction mass and the bearings into a single support structure so that constant hydrodynamic lubrication of the bearings is achieved even during stopping and reversal of the primary payload. This is accomplished by allowing the bearings to rotate continuously in one direction while the primary payload is oscillated. Torque compensation may be provided by applying an opposite torque to the reaction mass to minimize the torque disturbance experienced by the support structure.

9 Claims, 1 Drawing Sheet

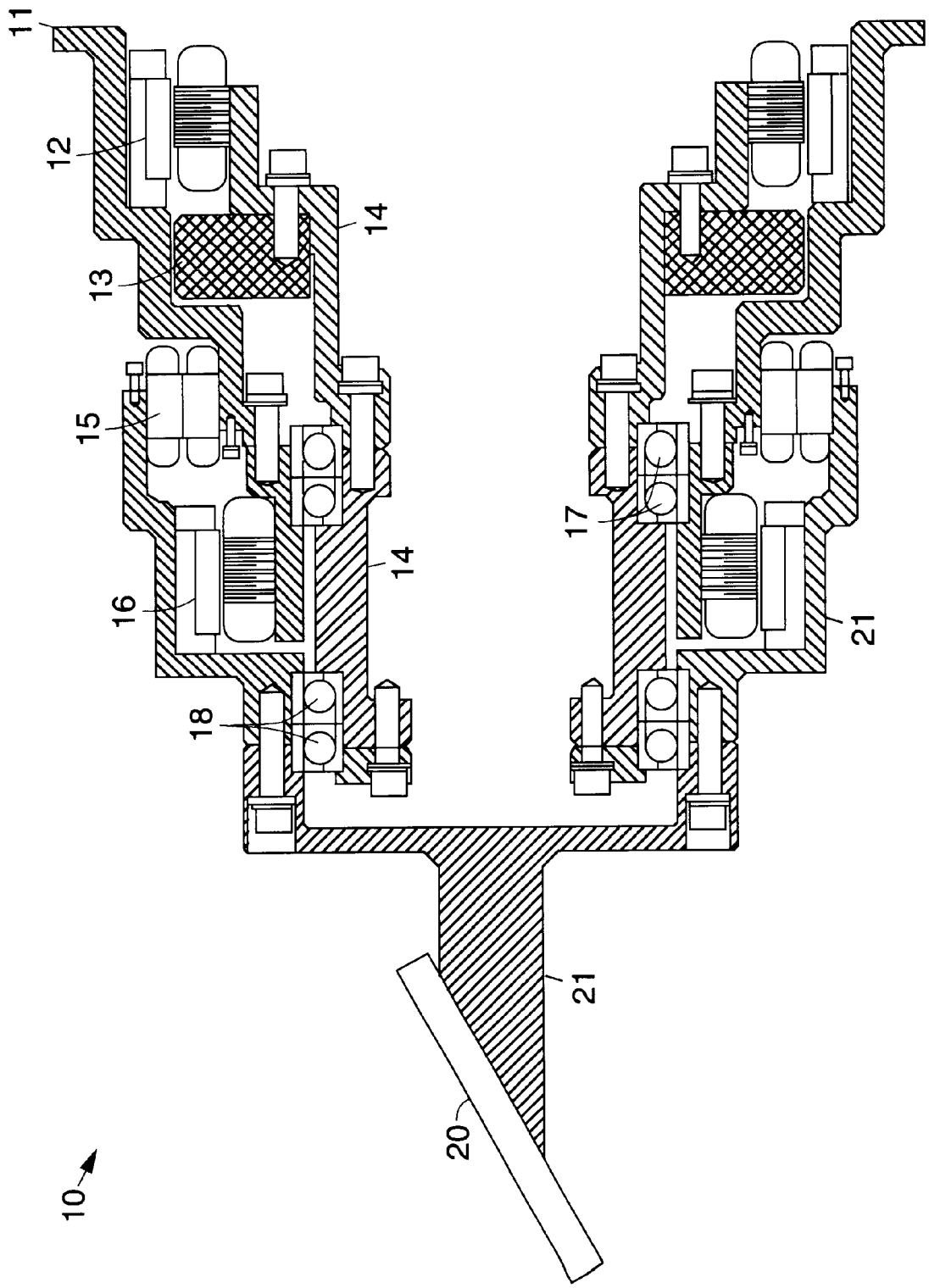

APPARATUS FOR SOLVING BEARING LIFE AND TORQUE COMPENSATION PROBLEMS IN SYSTEMS WITH OSCILLATING COMPONENTS

BACKGROUND

The present invention relates generally to systems that employ oscillating components, and more particularly, to a system that provides an integrated solution to bearing life and torque compensation problems in systems having oscillating components.

In the application of mechanical elements subjected to oscillatory rotary motion, the variation of speed due to slow down, stopping and reversing of the direction of rotation, causes two undesirable results. The first is the interruption of the lubrication film between the bearing rolling stock (balls, rollers) and the bearing races, which degrades the life of the bearings. The second is the creation of a reaction torque that disturbs the supporting structure.

The interruption of motion at the end of each oscillation due to stopping and reversing actions creates a temporary dry condition in the bearings due to the interruption of hydrodynamic flow of lubricant. This temporary dry condition produces high friction and contact stresses that considerably shorten the life of the bearing.

Traditional designs use lubrication systems where oil is pumped or fed by gravity to submerge balls of the bearings in oil and prevent dry running. This type of system produces high friction and is very susceptible to oil migration and leaks.

Traditionally, reaction torque compensation is done using a mass that produces an inertial that matches the inertia of a primary payload. The mass is moved an equal amount but in the opposite direction from the primary payload to cancel the disturbance torque. Since this is accomplished using a system that also operates in oscillatory motion, it subjects the bearings supporting the reaction mass to oscillatory motion. The end result is that two sets of bearings operate in a very unfavorable environment with regard to bearing life.

It would therefore be desirable to have a system that provides an integrated solution to bearing life and torque compensation problems in systems having oscillating components.

SUMMARY OF THE INVENTION

The present invention provides for a system that extends the life of bearings that support a primary payload and operate in oscillatory mode. The system integrates the primary payload, a reaction mass and the bearings into a single support structure so that constant hydrodynamic lubrication of the bearings is achieved even during stopping and reversal of the primary payload. This is accomplished by allowing the bearings to rotate continuously in one direction while the primary payload is oscillated. The system also provides for torque compensation by applying an opposite torque to a reaction mass to minimize the torque disturbance experienced by the support structure.

BRIEF DESCRIPTION OF THE DRAWINGS

The various features and advantages of the present invention may be more readily understood with reference to the following detailed description taken in conjunction with the accompanying drawing which illustrates an exemplary system in accordance with the principles of the present invention.

DETAILED DESCRIPTION

Referring to the drawing FIGURE, it illustrates an exemplary system 10 in accordance with the principles of the present invention. The system 10 embodies oscillating components supported by bearings, and provides for an integrated solution to bearing life and torque compensation problems.

The exemplary system 10 comprises a primary payload 20, which is illustrated as a scan mirror 20 that is attached to a primary payload support structure 21. However, the concepts of the present invention may be used with other types of payloads 20. The scan mirror 20, or primary payload 20, is supported on a plurality of bearings 18 that are attached to a reaction mass 13. The reaction mass 13, in turn, is supported on a plurality of reaction mass bearings 17 that are connected to a base structure 11.

Two torque or drive motors are used. A primary payload drive motor 16 is connected to the base structure 11 and drives the primary payload 20. A reaction mass drive motor 12 is connected to the base structure 11 and drives the reaction mass 13. A resolver 15, coupled between the base structure 11 and the primary payload support structure 21, is used to measure the position of the primary payload 20 with respect to the base structure 11.

By continuously rotating the reaction mass 13 in one direction at a speed that is higher than any rotational speed that the primary payload 20 needs to turn at, the bearings 17, 18 are made to rotate continuously while the primary payload 20, through it's ground-based primary payload drive (torque) motor 16, is made to oscillate with respect to ground. In this way, the bearings 17, 18 experience varying angular speed but never change their directions of rotation. This maintains constant hydrodynamic lubrication and increases reliability.

The system 10 provides the added benefit of torque compensation if desired. The torque applied to the primary payload 20 (scan mirror 20) by way of the primary payload (scan mirror) drive motor 16, may be countered by applying an equal but opposite torque to the reaction mass 13, using the reaction mass drive motor 12. The profile of the motion must be analyzed so that the nominal rotational velocity of the reaction mass 13 is selected to insure that the bearings 17, 18 never see a change in direction. In this way, torque compensation is achieved without any bearing 17, 18 experiencing a change in its direction of rotation.

The present invention may be advantageously employed in gimbals and mechanisms that are used in strategic, tactical and especially spaceborne systems and applications to increase reliability and provide for reduction of reaction torque in such systems.

Thus, a system that provides an integrated solution to bearing life and torque compensation problems in systems having oscillating components has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A system comprising:

a primary payload;

a reaction mass;

a first bearing coupling the primary payload to the reaction mass;

a base structure;

a second bearing coupling the reaction mass to the base structure;

a first torque motor coupled to the base structure that drives the primary payload;

a second torque motor coupled to the base structure that drives the reaction mass; and a resolver for measuring the position of the primary payload relative to the base structure.

2. The system recited in claim 1 wherein the reaction mass is caused to continuously rotate in a direction and at a speed that is higher than the rotational speed of the primary payload, and the first torque motor is caused to oscillate with respect to the base structure, such that the bearings experience varying angular speed but do not change their respective directions of rotation, which maintains constant hydrodynamic lubrication of the bearings.

3. The system recited in claim 1 wherein the primary payload comprises a scan mirror.

4. The system recited in claim 1 wherein the first torque motor is caused to apply torque to the primary payload, wherein the second motor is caused to apply an equal but opposite torque to the reaction mass to cancel the torque experienced by the base structure.

5. The system recited in claim 4 wherein the nominal reaction mass rotational velocity is selected to insure that the bearings never see a change in direction.

6. A system having improved bearing life comprising:

a primary payload;

a reaction mass;

a first plurality of bearings coupling the primary payload to the reaction mass;

a base structure;

a second plurality of bearings coupling the reaction mass to the base structure;

a first torque motor coupled to the base structure that drives the primary payload;

a second torque motor coupled to the base structure that drives the reaction mass; and a resolver for measuring the position of the primary payload relative to the base structure;

wherein the reaction mass is caused to continuously rotate in a direction and at a speed that is higher than the rotational speed of the primary payload, and the first torque motor is caused to oscillate with respect to the base structure, such that the bearings experience varying angular speed but do not change their respective directions of rotation, which maintains constant hydrodynamic lubrication of the bearings.

7. The system recited in claim 6 wherein the primary payload comprises a scan mirror.

8. The system recited in claim 6 wherein the first torque motor is caused to apply torque to the primary payload, wherein the second motor is caused to apply an equal but opposite torque to the reaction mass to cancel the torque experienced by the base structure.

9. The system recited in claim 8 wherein the nominal reaction mass rotational velocity is selected to insure that the bearings never see a change in direction.

* * * * *